United States Patent
Jaeger et al.

(10) Patent No.: US 8,801,343 B2
(45) Date of Patent: Aug. 12, 2014

(54) ROTATING CUTTING TOOL AND GUIDE INSERT THEREFOR

(75) Inventors: Horst Manfred Jaeger, Nürnberg (DE); Xaver Franz Spichtinger, Oberviechtach (DE)

(73) Assignee: Kennametal Inc., Latrobe, PA (US)

( * ) Notice: Subject to any disclaimer, the term of this patent is extended or adjusted under 35 U.S.C. 154(b) by 267 days.

(21) Appl. No.: 13/276,678

(22) Filed: Oct. 19, 2011

(65) Prior Publication Data

US 2012/0134759 A1    May 31, 2012

(30) Foreign Application Priority Data

Nov. 29, 2010   (DE) .......................... 10 2010 052 845

(51) Int. Cl.
  *B23B 51/02*   (2006.01)
  *B23B 51/04*   (2006.01)

(52) U.S. Cl.
  CPC ................................ *B23B 51/0493* (2013.01); *B23B 2251/56* (2013.01)
  USPC .............................................. 408/83; 408/57

(58) Field of Classification Search
  USPC ............... 408/79, 80, 81, 82, 83, 57, 59, 713, 408/188, 231
  See application file for complete search history.

(56) References Cited

U.S. PATENT DOCUMENTS

| | | | | |
|---|---|---|---|---|
| 1,407,560 A * | 2/1922 | Maxwell | ...................... | 408/185 |
| 1,414,565 A * | 5/1922 | Gallagher | ...................... | 408/116 |
| 2,741,936 A * | 4/1956 | Wohlfahrt | ...................... | 408/1 R |
| 3,348,434 A * | 10/1967 | Plummer | ...................... | 408/83 |
| 3,422,706 A * | 1/1969 | Lunsford | ...................... | 408/59 |
| 3,548,687 A * | 12/1970 | Holloway | ...................... | 408/206 |
| 3,751,177 A * | 8/1973 | Faber | ...................... | 408/200 |
| 3,998,566 A * | 12/1976 | Williams | ...................... | 408/226 |
| 4,133,399 A * | 1/1979 | Herrmann | ...................... | 175/384 |
| 4,184,794 A * | 1/1980 | Henninghaus | ...................... | 408/57 |
| 4,240,770 A * | 12/1980 | Berstein | ...................... | 408/83 |
| 4,293,252 A | 10/1981 | Kress et al. | | |
| 4,571,128 A * | 2/1986 | Ogden | ...................... | 408/1 R |
| 4,571,130 A * | 2/1986 | Kress et al. | ...................... | 408/143 |
| 6,503,030 B2 * | 1/2003 | Kress et al. | ...................... | 408/188 |
| 6,575,672 B1 * | 6/2003 | Maier | ...................... | 408/59 |

(Continued)

FOREIGN PATENT DOCUMENTS

DE   29 03 814 A1   8/1980
EP   0 120 226 A2   10/1984

(Continued)

OTHER PUBLICATIONS

German Patent Office, "German Office Action", mailed Sep. 26, 2011, 4 pp.

*Primary Examiner* — Daniel Howell
*Assistant Examiner* — Nicole N Ramos
(74) *Attorney, Agent, or Firm* — Larry R. Meenan, Esq.

(57) ABSTRACT

A rotating cutting tool includes a single or multi-piece support part having an end face and a circumferential wall, an interchangeable cutting insert provided at or about the end face, and at least one interchangeable guide insert coupled to the support part via a retaining means. The at least one interchangeable guide insert being free of cutting edges and protruding radially relative to the circumferential wall. The at least one interchangeable guide insert including a guide section which protrudes radially furthest outward. The guide section lying axially at the level of the retaining means and offset from the retaining means in the circumferential direction.

6 Claims, 3 Drawing Sheets

(56) References Cited

U.S. PATENT DOCUMENTS

| | | | |
|---|---|---|---|
| 6,682,275 B1 * | 1/2004 | Lindblom et al. | 408/59 |
| 7,207,750 B2 * | 4/2007 | Annanolli et al. | 408/83 |
| 2010/0054879 A1 * | 3/2010 | Nedzlek | 408/1 R |
| 2010/0104385 A1 * | 4/2010 | Nomura et al. | 408/83 |
| 2010/0196110 A1 * | 8/2010 | Kress | 408/147 |

FOREIGN PATENT DOCUMENTS

| | | | |
|---|---|---|---|
| JP | 58165910 A | * | 10/1983 |
| SU | 1484470 A | * | 6/1989 |
| WO | WO 2009030188 A1 | * | 3/2009 |

\* cited by examiner

ROTATING CUTTING TOOL AND GUIDE INSERT THEREFOR

BACKGROUND

1. Field of the Invention

The present invention relates rotating cutting tools, and more particularly, to rotating cutting tools having at least one interchangeable guide insert. The present invention also relates to interchangeable guide inserts.

2. Background Information

Such rotating cutting tools are normally drilling tools having a shank which forms the support part or a shank together with drilling head which together form the support part for the interchangeable cutting insert. Rotating cutting tools can penetrate deep into the workpiece, wherein it has to be ensured on account of the freely projecting length of the cutting tool that said cutting tool remains sufficiently stable and neither bends nor wobbles.

It is known from US 2010/0104385 A1 to laterally provide on the support part, here the shank, a plurality of "guide inserts" distributed over the circumference. These guide inserts are there for guiding the cutting tool laterally in the drill hole. Normally, the cutting inserts are arranged symmetrically on the cutting tool in such a way that, under normal cutting conditions, the cutting forces act substantially symmetrically and thus no lateral resultant force is produced which would cause the cutting tool to bend. However, the cutting tool can also encounter an already existing opening during the drilling, such that a lateral force acts on the end of the cutting tool, and this lateral force could lead to bending of the shank. The guide inserts, which rotate very close to the wall of the drilled opening, then come into contact with the drill hole wall and stabilize the cutting tool. Owing to the fact that the guide inserts are separate parts which are detachably fastened to the shank or support body in a nondestructive manner, they can be exchanged in the event of wear, but in particular can also be set with regard to their position and orientation.

Previous guide inserts were fastened to the support part via screws, which constitute retaining means. To this end, the guide insert has a central through-hole and, in the region of the through-hole, a recess which runs in the circumferential direction and in which the screw head lies.

However, it has been found that, despite the deeper-set screw head, drilling chips get caught in the region of the screw head, and so said drilling chips easily scrape along the inner wall of the drill hole and damage its surface. In addition, after prolonged use, a layer of compressed drilling chips forms around the screw, and these drilling chips make it difficult to drive the screw if it is to be released.

Accordingly, there exists a need for improved rotating cutting tools which utilize one- or multi-piece support parts.

SUMMARY OF THE INVENTION

Accordingly, deficiencies in the prior art are addressed by embodiments of the invention which are directed to a cutting tool in which the abovementioned disadvantages are removed. In addition, a guide insert is provided which, when used on a cutting tool, has less of a tendency to allow the chips to collect on the guide insert in the region of the retaining means.

As one aspect of the invention, a cutting tool of the type mentioned at the beginning in that the guide section lies axially at the level of the retaining means and offset from the retaining means in the circumferential direction is provided. Whereas the guide section, which is normally embodied as a bead, was divided into two in the prior art in the axial direction by the recess at the through-hole, provision is made according to the invention for the retaining means to be positioned in the direction of rotation before or after, but in particular after, the guide section and for the guide section not to be divided into sections. The groove or recess provided in the prior art for accommodating the screw head in the region of the guide section is therefore dispensed with. No recess in which chips can collect during the rotation is provided.

The guide insert should have an aperture on which the retaining means acts or through which it extends.

An example of such an aperture is a preferably radially running through-hole, through which the retaining means, in particular a screw, extends.

In a further embodiment of the invention, the retaining means engages on an end face of the guide insert and thus lies at a distance from the guide section. Conceivable in this connection is a solution in which the guide insert becomes wider laterally relative to its surface area with which it bears against the cutting tool. This sloping end face then makes contact with the retaining means. If the retaining means bears with a sloping surface against the guide insert, the sloping surface should be substantially adapted to the slope of the end face, for example by using a countersunk head screw.

A further example of a retaining means engaging on the end face of the guide insert consists in the fact that the aperture is embodied as an end-face, in particular a groove-like, recess in the guide insert. The retaining means extends along the recess and partly projects into it. In this embodiment, it is in particular advantageous if the retaining means extends axially in the support part and therefore is not exposed radially. In order to securely hold the guide insert on the support part, in particular if only one retaining means is used, the circumferential wall can have a pocket adapted to the shape of the guide insert or at least a type of step. The guide insert itself then lies in the pocket, which is preferably designed to be complementary to the guide insert, the guide insert preferably bearing with one or more end faces against the edge of the pocket.

A variant of the pocket solution provides for at least one elastic element to be provided which forms a type of snap lock between the side wall of the pocket and the guide insert. Screws are therefore no longer necessary for fastening the guide insert.

Furthermore, a rotating cutting tool is provided which comprises a one- or multi-piece support part which has an end face on which at least one preferably interchangeable cutting insert is provided and a circumferential wall, to which at least one interchangeable guide insert which is free of cutting edges and protrudes radially relative to the circumferential wall is fastened. The circumferential wall has a pocket which is adapted to the shape of the guide insert and in which the guide insert is accommodated and clamped free of retaining means in a positive-locking manner. In this embodiment, no retaining means is necessary; the guide insert is simply put into a pocket and has a shape adapted to the shape of the side walls of the pocket. In particular, the pocket is an axial groove with a dovetail guide.

As viewed in the axial direction, the guide section is crowned, that is to say it is convex.

According to a preferred embodiment, this crowning is designed to be asymmetrical in the circumferential direction. The side surface which points in the direction of rotation, to be more precise in the cutting direction of rotation, should be set flatter than the opposite side surface, at least in the region which projects beyond the circumferential wall.

Furthermore, provision is optionally made for the guide section to extend over substantially the entire axial length of the guide insert in order to make the bearing surface or bearing line as large as possible and avoid jamming of chips.

An advantageous development of the invention provides for a cooling passage to open outward at the circumferential wall in the support part.

A preferred embodiment in this connection proposes that the orifice of the cooling passage be provided at the edge of the guide insert. The cooling effect is optimized if the cooling passage opens out in front of the guide section in the direction of rotation so that the outflowing coolant can act directly on the guide section.

The guide insert can be rectangular, square, circular, triangular or trapezoidal. In addition, clearly defined positioning of the guide insert on the support part can be established via a triangular shape or, even better, trapezoidal shape.

The guide section runs in particular along the broad side of the trapezium. The retaining means can then be provided in the narrower region.

A guide insert for an abovementioned rotating cutting tool is also provided. The guide insert being characterized in that the guide insert has an outer side with a projecting guide section running in a longitudinal direction and an aperture for a retaining means, wherein the aperture is arranged in the longitudinal direction in the region of the guide section but laterally at a distance from the guide section.

In addition, provision is made for the guide section to be designed to be continuous in the longitudinal direction and for it to preferably extend over the entire length of the guide insert as well.

As already mentioned, the aperture can be a through-hole or an end-face, in particular groove-like, recess which runs along the end face.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
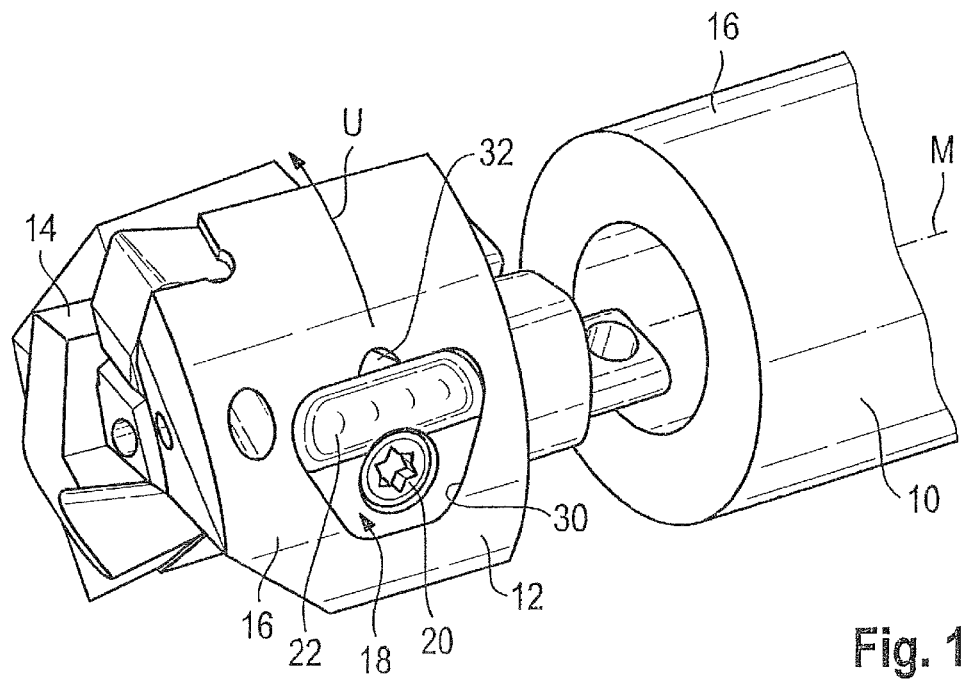
FIG. 1 shows a perspective view of a cutting tool according to an embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the term "about" shall be used to refer to a point near, or at, a particular identified point (i.e., proximate).

A rotating cutting tool in the form of a drill is shown in FIG. 1. The cutting tool has a multi-piece support part with a shank 10 and a drill bit 12 fastened at the end face to the shank. A plurality of interchangeable cutting inserts 14, of which one cutting insert is shown, are fastened to the end face of the support part, here the drill bit 12. The two-piece support part with shank 10 and drill bit 12 has a circumferential wall 16, the same reference numerals being used for the circumferential wall of the drill bit 12 and of the shank 10 in the present exemplary embodiment for the sake of simplification.

Close to the free end of the support part, in the drill bit 12 in the present exemplary embodiment, a plurality of guide inserts 18 free of cutting edges and distributed uniformly over the circumference are attached to the circumferential wall 16 via retaining means 20. In the embodiment shown, to which, however, the invention is not to be restricted, the retaining means 20 are screws. The guide inserts 18 are plate-like structures.

Figure 2:
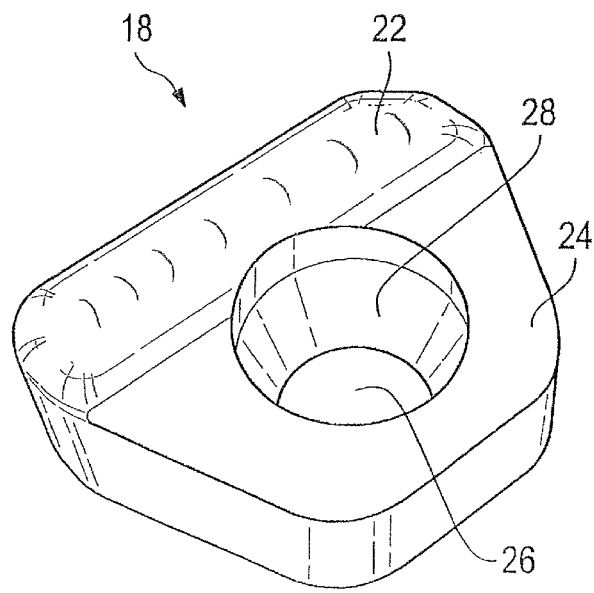
FIG. 2 shows a perspective view of the guide insert of the cutting tool shown in FIG. 1.

The guide insert 18 of FIG. 1 can be better seen in FIG. 2. The guide insert 18 has a plurality of sections, in particular a radially projecting guide section 22, which in the fitted state protrudes radially furthest outward and beyond the circumferential wall 16 of drill bit 12 and is provided for making contact with the inside of the drill hole. The guide section 22 extends linearly and preferably over the entire length of the cutting insert. In the fitted state, the orientation of the guide section 22 should run parallel to the center axis M of the cutting tool and thus in the axial or longitudinal direction; however, it can also be set slightly obliquely. The guide section 22 runs continuously and is not interrupted. Starting from the guide section 22, there is a lower-lying surface area 24 which has an aperture 26 in the form of a through-hole. This through-hole preferably has a cone-shaped widened portion 28 or a step toward the surface area 24.

In the fitted state of the guide insert 18, the guide section 22 lies, as shown, axially, that is to say in the direction of the center axis M, at the level of the retaining means 20 and of the through-hole 26 but offset therefrom in the circumferential direction. That is to say, the retaining means 20 or the aperture 26 does not split the guide section 22 into two sections.

In FIG. 1, the direction of rotation during the drilling is identified by an arrow U. As can be seen from FIG. 1, the aperture 26 as well as the retaining means 20 lie behind the guide section 22 in the direction of rotation U, such that no chips or contaminants can collect on the retaining means 20. In other words, the recess 26 and the retaining means 20 are arranged in a protected manner behind the guide section 22 in the circumferential direction.

As can be seen from FIG. 2, the guide section 22 is embodied as a crowned web as viewed in the axial direction.

The guide insert 18 according to the embodiment in FIG. 1 has a substantially trapezoidal form, and the circumferential wall 16 has a substantially complementary pocket 30, in which the guide insert 18 is accommodated. The depth of the pocket 30 is in this case preferably selected in such a way that the surface area 24 does not project radially outward relative to the circumferential wall 16. In addition, the widened portion 28 is also embodied relative to the screw head in such a way that the screw head does not project outward relative to the surface area 24.

A cooling passage 32 opens outward in front of the guide section 22 in the direction of rotation U; in particular, the orifice is provided directly at the edge of the guide insert 18.

Figure 3:
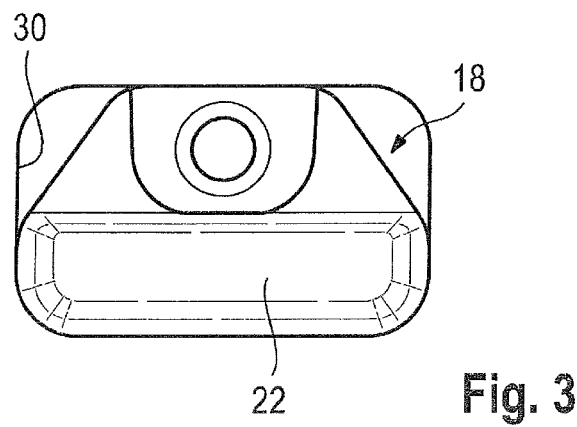
FIG. 3 shows a plan view of a fitted guide insert according to an embodiment of the present invention.

Whereas in the example embodiment according to FIG. 2 the cone-shaped widened portion 28 slightly cuts the bead-like guide section 22, this is not the case in the embodiment according to FIG. 3. In the embodiment of FIG. 3, the pocket 30 is also not completely adapted to the trapezoidal shape of the guide insert 18, but rather is of substantially rectangular shape. Such arrangement makes it easier to produce the pocket 30.

Figure 4:
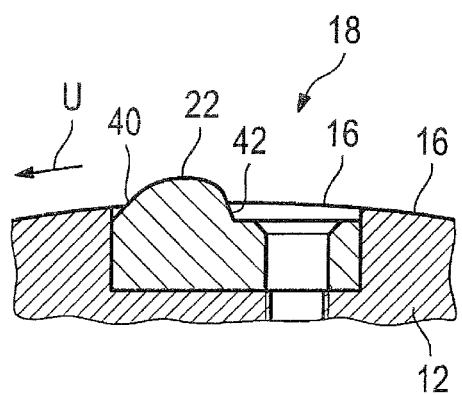
FIG. 4 shows an axial view of the guide insert according to FIG. 3.

The axial view according to FIG. 4 shows that, of the guide section 22, only the outermost part projecting relative to the circumferential wall 16 can assume a guidance task during the drilling. In addition, the crowned, stepless guide section 22, at its opposite end faces 40, 42 in the circumferential direction, is provided with different radii or different slopes. The end face 40 pointing in the circumferential direction U is set flatter than the opposite end face 42.

Figure 5:
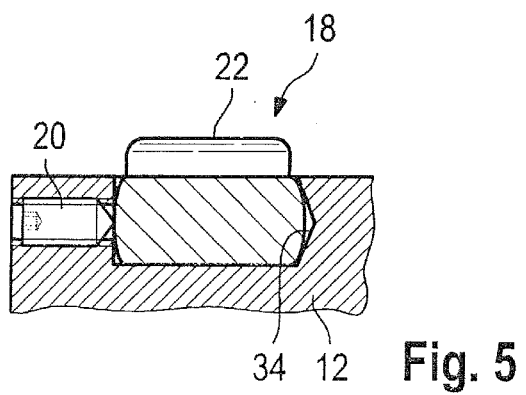
FIG. 5 shows a longitudinal sectional view through a cutting tool according to another embodiment of the present invention.

In the example embodiment according to FIG. 5, the retaining means 20 is not screwed radially into the support part but rather is screwed in axially. In this case, a retaining means 20 (here a headless screw) presses the guide insert 18 into a side wall 34, recessed in a groove-like manner, of the pocket 30 and clamps the guide insert 18 in the process.

Figure 6:
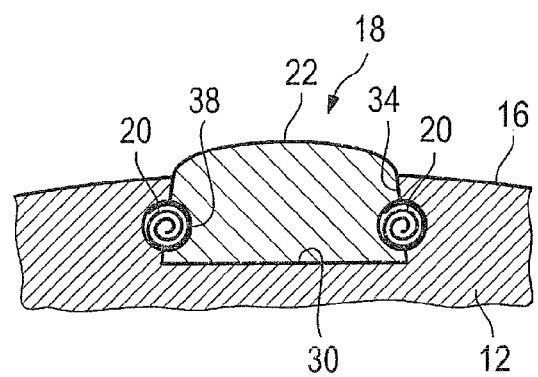
FIG. 6 shows a radial sectional view through a cutting tool with a guide insert according to another embodiment of the present invention.

In the example embodiment according to FIG. 6, the guide insert 18 has groove-like recesses 38 running along its opposite end faces. Here, the retaining means 20 are spring pins which run axially along the side walls 34 and lie partly in the recess 38 and partly in the side wall 34 of the pocket 30. This results in an elastic, positive-locking snap-in connection.

Figure 7:
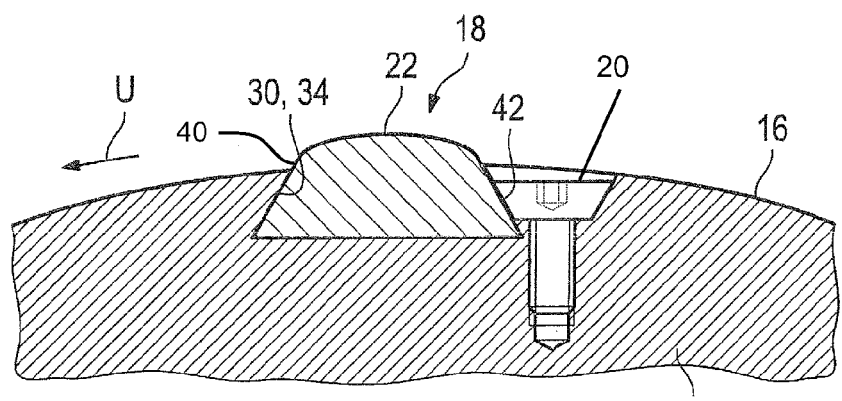
FIG. 7 shows a radial sectional view through a rotating cutting tool according to a further embodiment of the present invention.

The example embodiment according to FIG. 7 is in turn distinguished by the fact that the retaining means 20 embodied as a countersunk head screw bears against a sloping end face 42 of the guide insert 18 and presses the latter into the pocket 30. Here, too, side walls 40, 42 can encounter a correspondingly shaped side wall 34 of the pocket, such that positive locking which prevents the guide insert 18 from falling out is provided.

Figure 8:
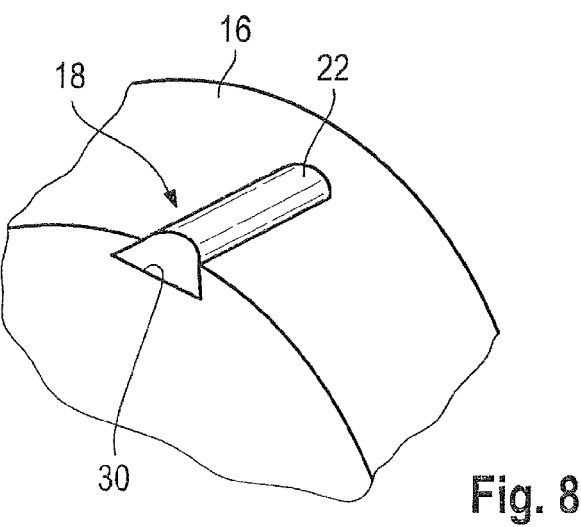
FIG. 8 shows a plan view of a guide insert according to yet another embodiment of the present invention.

The example guide insert 18 according to FIG. 8 requires no retaining element for locking on the support part. Rather, the guide insert 18 is designed as a linear, rod-like body which is inserted into a pocket 30 embodied with undercut side walls 34 and is clamped therein in a self-locking manner, e.g. via a dovetail guide, and/or is adhesively bonded therein. In particular, the pocket 30 runs as an axial groove.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A rotating cutting tool comprising:
a single or multi-piece support part having an end face and a circumferential wall;
an interchangeable cutting insert provided at or about the end face; and
at least one interchangeable guide insert coupled to the support part via a retaining means, the at least one interchangeable guide insert being free of cutting edges and protruding radially relative to the circumferential wall,
wherein the at least one interchangeable guide insert comprises a guide section which protrudes radially furthest outward and a lower-lying surface area that starts from the guide section and does not project radially outward relative to the circumferential wall, and wherein the guide section lies axially at the level of the retaining means and offset from the retaining means in the circumferential direction,
wherein the at least one interchangeable guide insert comprises an aperture into which the retaining means extends, and wherein the aperture is a radial through-hole for the retaining means.

2. The cutting tool as recited in claim 1, wherein the at least one interchangeable guide insert comprises a groove-like recess formed in an end face of the at least one interchangeable guide insert, and wherein the retaining means extends along, and at least partly projects into, the groove-like recess.

3. The cutting tool as recited in claim 1, wherein the circumferential wall comprises at least one pocket adapted to the shape of the at least one interchangeable guide insert.

4. The cutting tool as recited in claim 1, wherein the guide section extends over substantially the entire axial length of the at least one interchangeable guide insert.

5. The cutting tool as recited in claim 1, wherein the retaining means engages on an end face of the at least one interchangeable guide insert.

6. The cutting tool as recited in claim 1, wherein the support part comprises a cooling passage opening outward at the edge of the at least one interchangeable guide insert.

* * * * *